Figure 1:
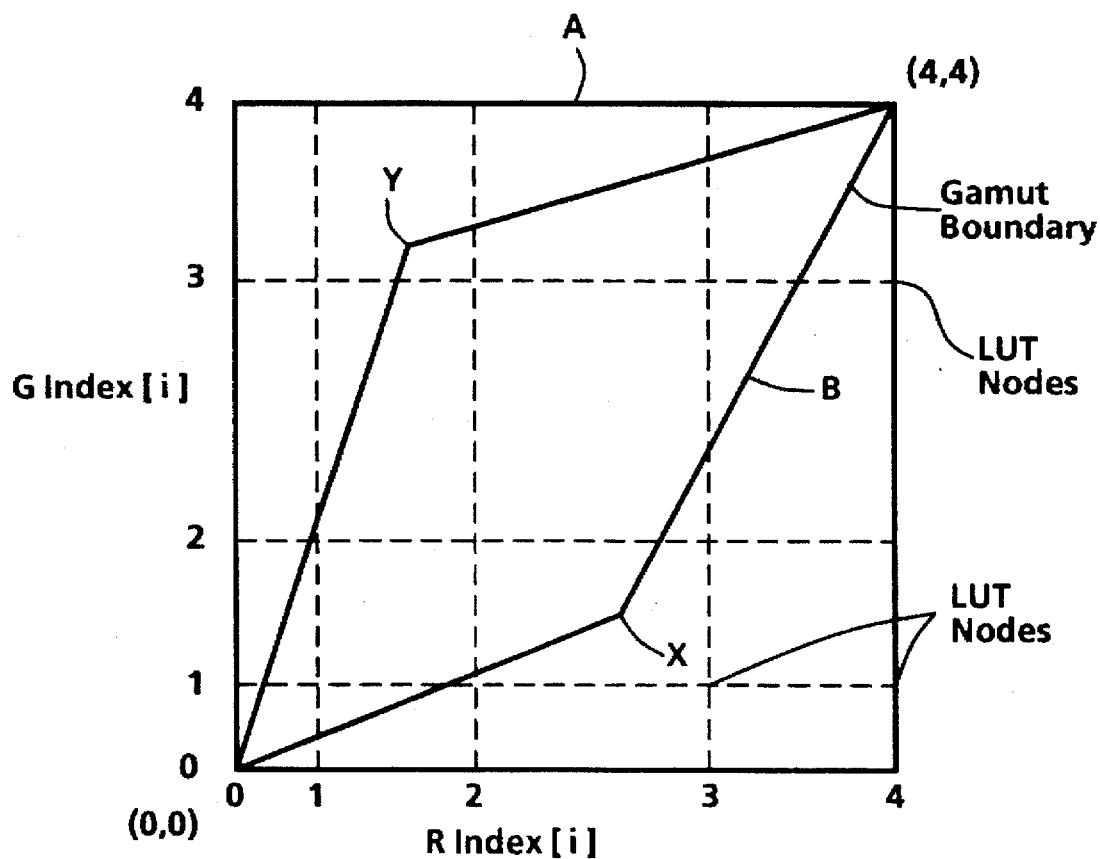

United States Patent [19]

Rolleston

[11] Patent Number: 5,689,350
[45] Date of Patent: Nov. 18, 1997

[54] COLOR PRINTER CALIBRATION METHOD FOR ACCURATELY RENDERING SELECTED COLORS

[75] Inventor: Robert J. Rolleston, Penfield, N.Y.

[73] Assignee: Xerox Corporation, Stamford, Conn.

[21] Appl. No.: 354,306

[22] Filed: Dec. 12, 1994

[51] Int. Cl.[6] ............................. H04N 1/46; G03F 3/08
[52] U.S. Cl. ...................... 358/504; 358/518; 358/523
[58] Field of Search ..................... 358/500, 501, 358/504, 518, 523, 525, 406, 519, 520, 521, 524, 522, 527; 382/162, 166, 167; 395/109, 131

[56] References Cited

U.S. PATENT DOCUMENTS

| | | | |
|---|---|---|---|
| 2,790,844 | 4/1957 | Neugebauer | 358/518 |
| 4,275,413 | 6/1981 | Sakamoto et al. | 358/525 |
| 4,500,919 | 2/1985 | Schreiber | 358/518 |
| 5,296,923 | 3/1994 | Hung | 358/527 |
| 5,305,119 | 4/1994 | Rolleston | 358/522 |
| 5,323,249 | 6/1994 | Liang | 358/518 |
| 5,416,613 | 5/1995 | Rolleston et al. | 358/518 |
| 5,471,324 | 11/1995 | Rolleston | 358/518 |
| 5,483,360 | 1/1996 | Rolleston et al. | 358/518 |
| 5,528,386 | 6/1996 | Rolleston et al. | 358/522 |

OTHER PUBLICATIONS

Po–Chieh Hung, "Tetrahedral Division Technique Applied to Colorimetric Calibration for Imaging Media", Annual Meeting IS&T, NJ, May, 1992, pp. 419–422.

Po–Chieh Hung, "Colorimetric Calibration for Scanners and Media", SPIE, vol. 1448, Camera and Input Scanner System (1991).

Sigfredo I. Nin et al, "Printing CIELAB Images on a CMYK Printer Using Tri–Linear Interpolation", SPIE Proceedings, vol. 1670, 1992, pp. 316–324.

William J. Gordon et al, "Shepard's Method of 'Metric Interpolation' to Bivariate and Multivariate Interpolation", Mathematics of Computation, vol. 32, No. 141, Jan. 1978, pp. 253–264.

P. Lancaster et al, "Surfaces Generated by Moving Least Squares Methods"; Mathematics of Computation, vol. 32, No. 155, Jul. 1981, pp. 141–158.

P. Laihanen, "Colour Reproduction Theory Based on the Principles of Colour Science"; Advances in Printing Science & Technology, W.H. Banks ed, Pentech Press, London 1988, pp. 1–36.

P. Laihanen, "Optimization of Digital Color Reproduction on the Basis of Visual Assessment of Reproduced Images", Proceedings of the SID, vol. 30, No. 3, 1989, pp. 183–190.

D. Shepard, "A Two–Dimensional Interpolation Function for Irregularly–Spaced Data", Proceedings–1968 ACM National Conference, pp. 517–524.

Primary Examiner—Thomas D. Lee
Attorney, Agent, or Firm—Mark Costello

[57] ABSTRACT

A color printer calibration method for improving printer accuracy for particular colors provides a look up table with a plurality of nodes useful as table indices. In such a table, nodes are provided specifically indexing selected colors, so that such colors are obtainable without interpolation. The planes in which the selected colors are found replace the nearest standard planes, so the spacing of the table through the space is approximately retained.

12 Claims, 5 Drawing Sheets

COLOR PRINTER CALIBRATION METHOD FOR ACCURATELY RENDERING SELECTED COLORS

FIELD OF THE INVENTION

The present invention is directed towards compiling look up tables representative of printer characteristics, to enable the conversion of colors defined in a first color space to colors defined in the printer color space, and more particularly to a method for obtaining selected colors from said printer with a high degree of accuracy and consistency.

CROSS REFERENCE

Cross reference is made to the following co-pending applications: U.S. Ser. No. 08/223,494, filed Apr. 5, 1994, entitled "Color Printer Calibration with Improved Color Mapping Linearity", by R. J. Rolleston (assigned to the same assignee as the present application); U.S. Ser. No. 08/254,629, filed Jun. 6, 1994, entitled "Color Printer Calibration with Blended Look Up Tables", by R. J. Rolleston et al. (assigned to the same assignee as the present application); U.S. Ser. No. 08/131,168, filed Oct. 4, 1993, entitled "Reduced Storage of Pre-Computed Difference Tables Used in Color Space Conversion", by R. J. Rolleston (assigned to the same assignee as the present application); U.S. Ser. No. 08/316,968, filed Oct. 3, 1994, entitled "Color Printer Calibration Correcting for Local Printer Non-Linearities", by R. J. Rolleston et al. (assigned to the same assignee as the present application); U.S. Ser. No. 08/144,987, filed Oct. 29, 1993, entitled "Color Printer Calibration Test Pattern" by R. J. Rolleston et al. (assigned to the same assignee as the present application); and U.S. Ser. No. 08/179,284, filed Jan. 10, 1994, entitled "Color Printer Calibration Architecture", by R. J. Rolleston et al. (assigned to the same assignee as the present application).

INCORPORATION BY REFERENCE

The following patents are specifically incorporated by reference: U.S. Pat. No. 4,500,919 to Schreiber for its teachings of a color conversion system converting information from RGB to CMYK; U.S. Pat. No. 4,275,413 to Sakamoto for its teachings of tetrahedral interpolation between first and second color spaces; U.S. Pat. No. 2,790,844 to Neugebauer disclosing the desirability of defining an image in a first standard color space prior to conversion of the image coordinates to a second printer based coordinate system, and U.S. Pat. No. 5,296,923 to Hung; and U.S. Pat. No. 5,305,119 to Rolleston et al., which provides a discussion of a calibration systems in a color printing systems with a look up table. The following articles are also hereby incorporated by reference: Po-Chieh Hung, "Tetrahedral Division Technique Applied to Colorimetric Calibration for Imaging Media", Annual Meeting IS&T, N.J., May, 1992, pp. 419–422; Po-Chieh Hung, "Colorimetric Calibration for Scanners and Media", SPIE, Vol. 1448, Camera and Input Scanner System, (1991); Sigfredo I. Nin, et al., "Printing CIELAB Images on a CMYK Printer Using Tri-Linear Interpolation", SPIE Proceedings, Vol. 1670, 1992, pp. 316–324; William J. Gordon et al., "Shepard's Method of 'Metric Interpolation' to Bivariate and Multivariate Interpolation", Mathematics of Computation, Vol. 32, No. 141, Jan. 1978, pp. 253–264; P. Lancaster et al., "Surfaces Generated by Moving Least Squares Methods", Mathematics of Computation, Vol. 32, No. 155, July 1981, pp. 141–158; Pekka Laihanen, "Colour Reproduction Theory Based on the Principles of Colour Science", Advances in Printing Science and Technology, W. H. Banks ed., Pentech Press, London, 1988, pp. 1–36; Pekka Laihanen, "Optimization of Digital Color Reproduction on the Basis of Visual Assessment of Reproduced Images", Proceedings of the SID, Vol 30. No. 3, 1989, pp. 183–190; and Donald Shepard, "A two-dimensional interpolation function for irregularly spaced data," Proceedings-1968 ACM National Conference, pp. 517–524.

BACKGROUND OF THE INVENTION

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image. Scanner output is commonly transformed to a color space of tristimulus values, i.e., RGB (red-green-blue). Commonly, these values are a linear transformation of the standard XYZ coordinates of CIE color space, or a corrected transform of those values. In the case of computer generated images, colors defined by the user at the user interface of a workstation can be defined initially in color space of tristimulus values. These colors are defined independently of any particular device, and accordingly reference is made to the information as being "device independent".

Printers often have an output which can be defined as existing in a color space called CMYK (cyan-magenta-yellow-key or black) which is uniquely defined for the printer by its capabilities and colorants. Printers operate by the addition of multiple layers of ink or colorant in layers to a page. The response of the printer tends to be relatively non-linear. These colors are defined for a particular device, and accordingly reference is made to the information as being "device dependent". Thus, while a printer receives information in a device independent color space, it must convert that information to print in a device dependent color space, which reflects the gamut or possible range of colors of the printer.

The desirability of operating in a device independent color space with subsequent conversion to a device dependent color space is well known, as shown by U.S. Pat. No. 4,500,919 to Schreiber and U.S. Pat. No. 2,790,844 to Neugebauer, and U.S. Pat. No. 4,275,413 to Sakamoto. There are many methods of conversion between color spaces, all of which begin with the measurement of printer response to certain input values. Commonly, a printer is driven with a set of input values reflecting color samples throughout the printer gamut, the color samples are printed in normal operation of the printer. As previously noted, most printers have non-linear response characteristics.

In U.S. Pat. No. 4,275,413 to Sakamoto, the information derived is placed into look up tables, stored in a memory, perhaps ROM memory or RAM memory where the look up table relates input color space to output color space. The look up table is commonly a three dimensional table since color is defined with three variables. In RGB space, at a scanner or computer, space can be defined as three dimensional with black at the origin of a three dimensional coordinate system 0, 0, 0, and white at the maximum of a three dimensional coordinate system which an 8-bit system, would be located at 255, 255, 255. Each of the three axes radiating from the origin point therefore respectively define red, green, and blue. A similar construct can be made for the printer, with axes representing cyan, magenta, and yellow. In the 8-bit system suggested, there will be, however, over 16 million possible colors ($256^3$). There are clearly too many values for a 1:1 mapping of RGB to CMY. Accordingly, as proposed in U.S. Pat. No. 4,275,413 to Salcamoto, only a relatively small number of samples are used to do the mapping from RGB to CMY, perhaps on the order of 1,000. Therefore, the look up tables consist of a set of values which could be said to be the intersections for corners of a set of cubes mounted on top of one another. Colors falling within each cubic volume can be interpolated from the measured values, through many methods including tri-linear interpolation, tetrahedral interpolation, polynomial interpolation, linear interpolation, and any other interpolation method depending on the desired speed and accuracy of the result.

It would be very easy to index device dependent color values or specifications to device independent color specifications, but that is not the requirement. Instead, device independent or colorimetric specifications must be mapped to device dependent specifications. Several problems arise. Of course, the primary problem is that the printer response is not a linear response. A second problem is that the color space, and therefore the coordinates defined in the color space must be maintained as a uniform grid, for maximum efficiency of some interpolation methods, particularly for tetrahedral interpolation, a very desirable method of interpolation.

Accordingly, a three dimensional look up table (LUT) may be constructed which puts device independent input values into a predictable grid pattern. One method of accomplishing this requirement is by an interpolation process which derives a value at a desired location as a function of all (or a significant set) of measured color values. One way of doing this is to use Shepard's Method (see, for example "Shepard's Method of 'Metric Interpolation'to Bivariate and Multivariate Interpolation" by W. Gordon and J. Wixom, Mathematics of Computation, Vol. 32, No. 141, January 1978, pp. 253–264). Shepard's Method suggests that a vector can be thought of as defining the difference between an asked-for color which was directed to a printer in the printed color. Then, for any other point in color space which is desired, that point can be thought of as a vector quantity, derived by averaging over the space all the vectors, each vector weighted by a function which decreases its effect on the vector as that vector is further and further away from the point coloring question. In one useful formula, each vector is weighted by a function of $1/d^4$.

Alternatively the method of Po-Chieh Hung, "Colorimetric Calibration for Scanners and Media", SPIE, Vol. 1448, Camera and Input Scanner System, (1991), describes a method of inverse tetrahedral interpolation, to the same effect as the described Shepard's Method (see also U.S. Pat. No. 5,296,923 to Hung, previously incorporated by reference for its teachings). A requirement of this method is that the color space be segmented into a set of non-overlapping, space-filling tetrahedrons. This segmentation requirement is fulfilled by using only data from a full rectangular array of points, where it is easy to define the mesh of points which define the tetrahedrons.

A problem encountered in the use of such interpolation tables is that the only colors that are reproduced without interpolation are those that are at nodes in the table. Other values are the result of interpolating values in the neighborhood of the desired value. While errors may be small, there will be times when some set of non-interpolated colors are needed.

The references cited herein are incorporated by reference for their teachings.

SUMMARY OF THE INVENTION

In accordance with the invention there is provided a calibration method providing supporting tetrahedral interpolation for the derivation of color space transformation look up tables, and which also supports the direct mapping (mapping without interpolation) of selected colors between device independent and device dependent spaces.

In accordance with one aspect of the invention, a color printer calibration method for improving printer accuracy for specific colors includes the steps of:

a) empirically deriving a set of mappings, each mapping indicating a conversion from a printer color space color to colorimetric color space color;

b) identifying a first set of colors in colorimetric color space, for which mappings without interpolation from colorimetric space to device dependent space are desired;

c) identifying a second set of colors in colorimetric color space, dispersed through the space in accordance with a predetermined spacing function;

d) identifying from the first and second sets, colors which are near each other in color space, and replacing identified second set colors with corresponding identified first set colors, to generate a new final set of colors;

e) deriving from the empirically derived set of mappings an inverted set of mappings required for printer calibration at each of the colors in the final set of colors.

In using the described method, the goal of obtaining a filled rectangular or three dimensional mapping is obtained, while additionally improving calibration results through the use of the new empirical data to describe color mapping adjacent to the new empirical points.

To understand the problem, reference is made to FIG. 1. In this case, the limits of device independent space are shown by the outer square region A, while the gamut of a fictional device is shown by the interior of quadrilateral space B. Also shown in FIG. 1 are the locations of the nodes in a regular array of values which are used as indices to the look up table representing the mapping of device independent color space to device dependent color space. Note that while these node locations must form rectangular grids, there is no requirement that the grid has to be regular, but can be spaced at any known intervals. This global non-linear interval spacing of the nodes could be used to assure a finer sampling of a region of space where the response of the device is very non-linear (see, for example, U.S. Ser. No. 08/316,968, filed Oct. 3, 1994, entitled "Color Printer Calibration Correcting for Local Printer Non-Linearities", by R. J. Rolleston et al. (assigned to the same assignee as the present application), incorporated herein by reference)).

In this two dimensional example, the lower left corner of the rectangular (0,0) is pure black, while the upper right corner (4,4) is pure yellow. The other corners of the gamut space (labeled "X" and "Y") represent pure green and pure red, respectively.

The colorimetric values of the pure colorants (cyan, magenta and yellow for example), and their overprints (red, green and blue for example) will be dependent upon the materials and processes used to produce the colors. It is only by chance that the points of pure red and pure green will correspond to intersections of the nodal planes of the LUT. Accordingly, device independent values will have to be interpolated for these values. But in device dependent space, pure red is produced by a value of (255,0) and pure green by the value (0, 255). If pure red and pure green are to be produced when asked for, then the values in the several of the nodes surrounding these colors will have to be adjusted accordingly. This is not only a difficult task, but adjusting node values at one point will affect many surrounding interpolated values.

It is proposed to solve this problem by adjusting the location of the nodes in the LUT. It has been noted that the nodes in this type of table are typically spaced by a simple known spacing function, commonly a square root spacing. This accomplishes the goal of providing a good dispersal of nodes through space, and the square root function provides relatively large number of node values in the regions of color space where colors are formed with a high density of colorant, and a relatively small number of node values in regions of color space where colors are formed using small amounts of colorant. However, applicants have discovered that minor variations from the overall pattern of the node spacing spacing have no ill effects on the tables usefulness, and all certain colors to be exactlyreproduced.

Figure 2:
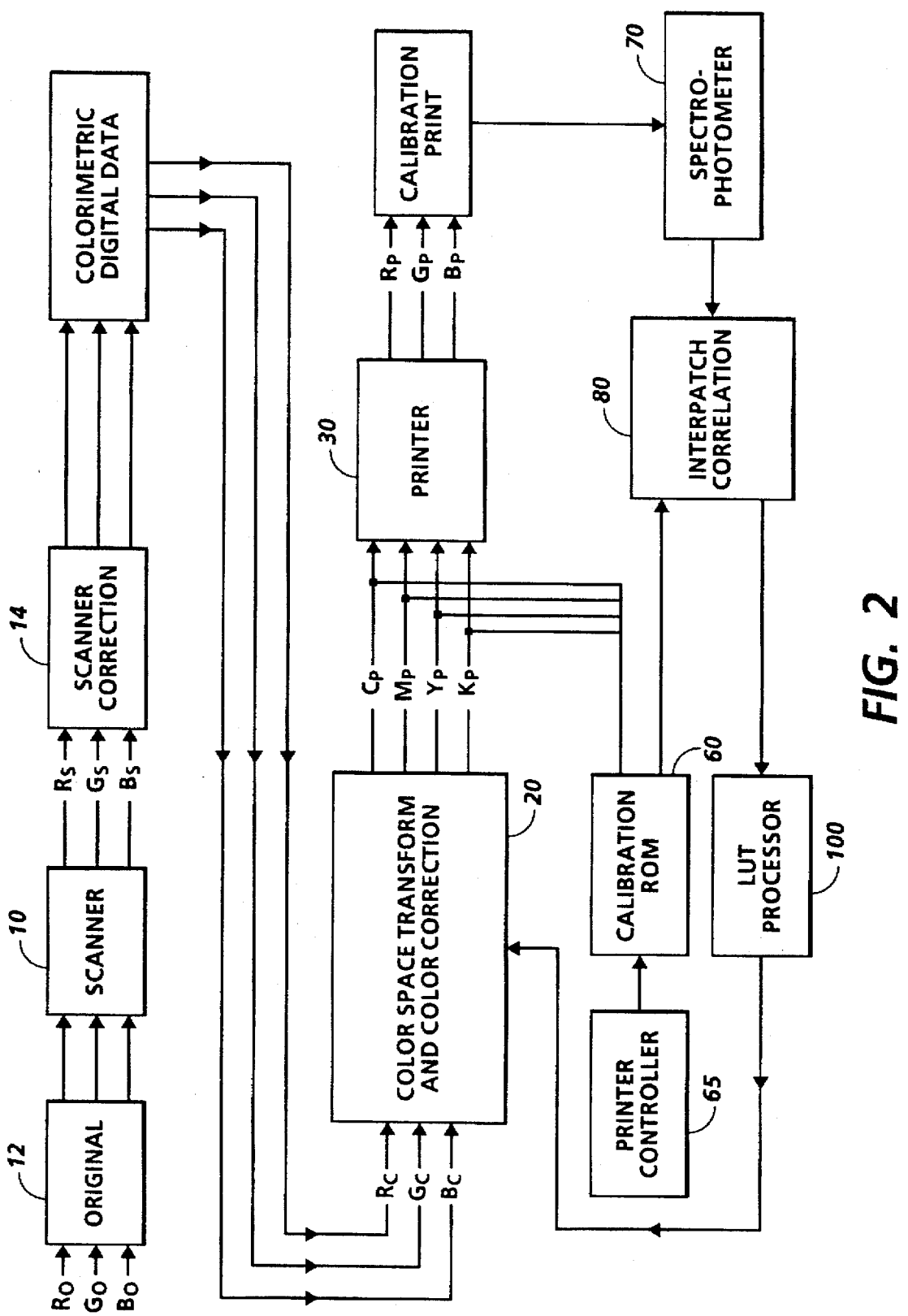
Figure 3:
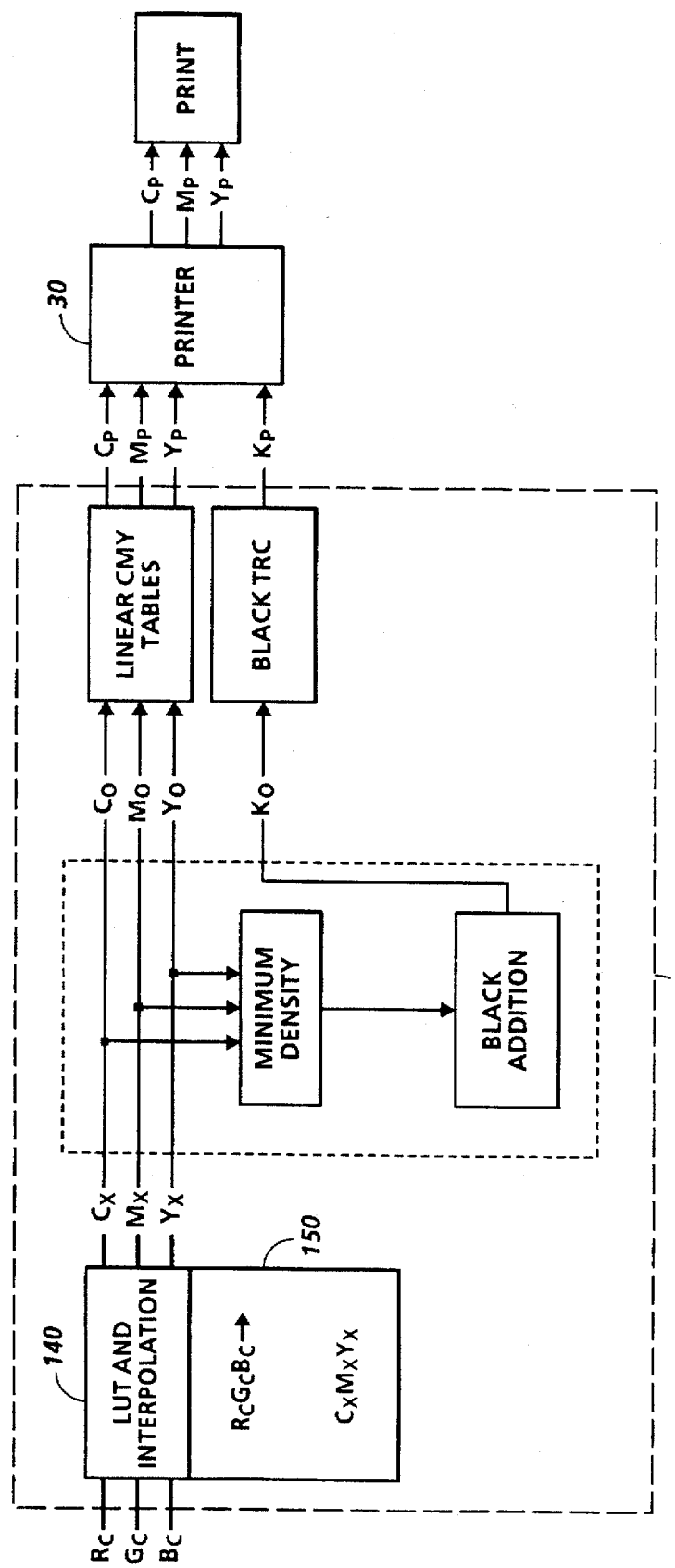
Figure 4:
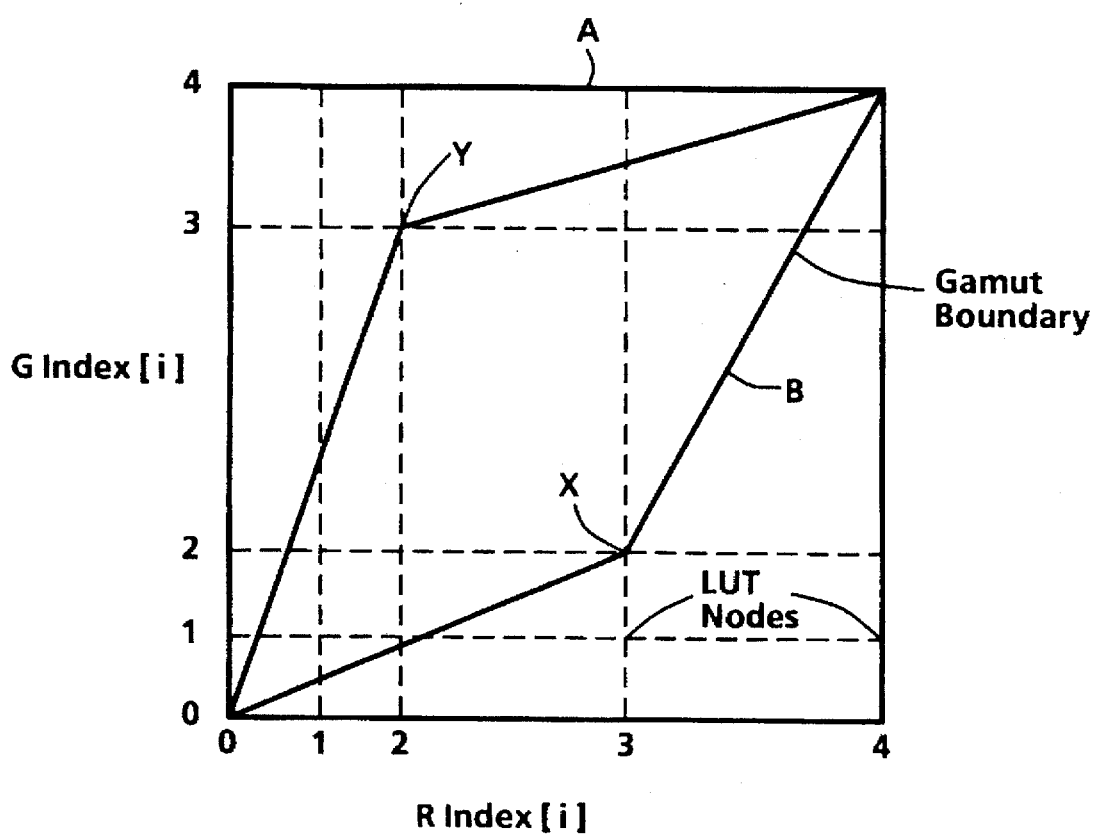
Figure 5:
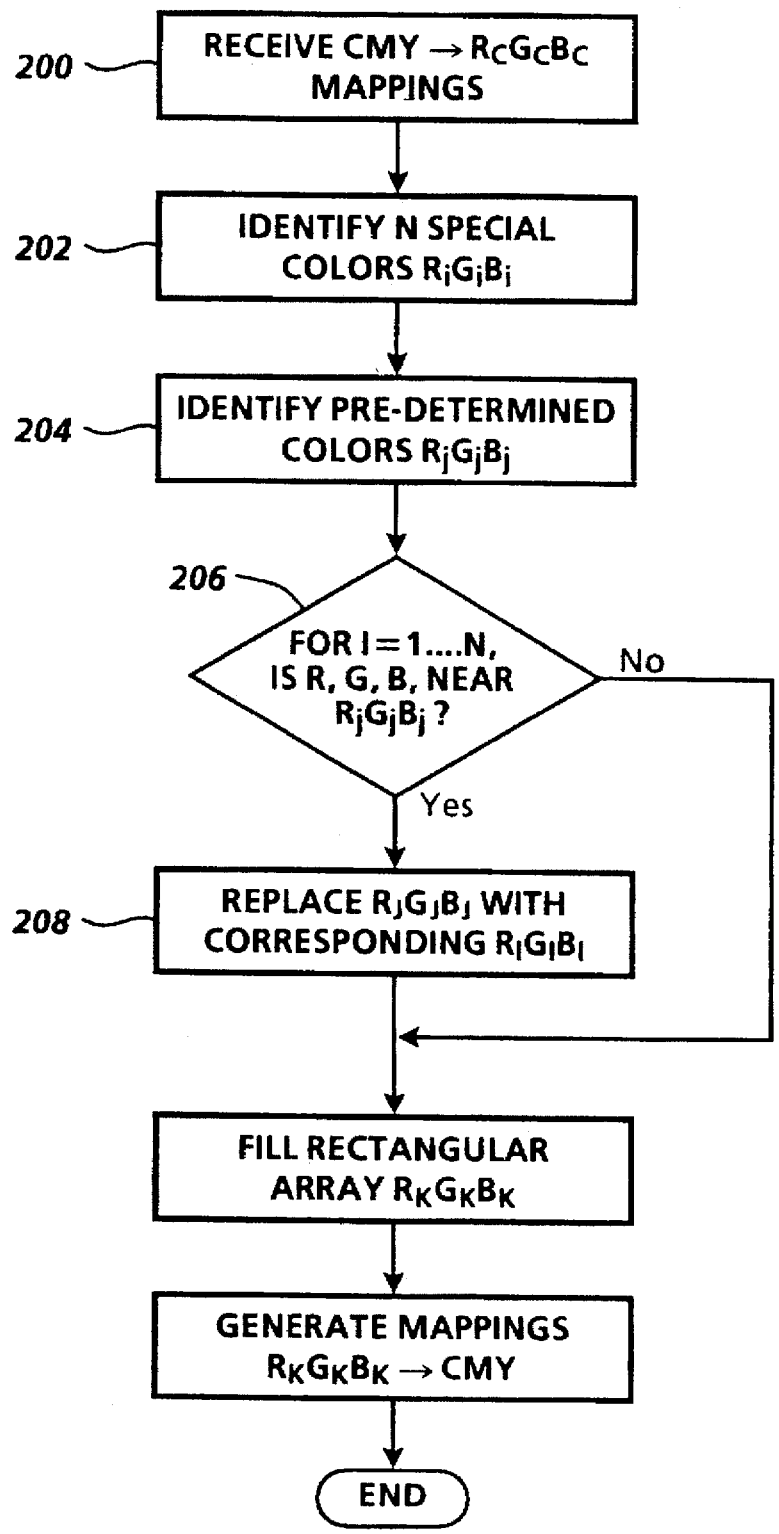

These and other aspects These and other aspects of the invention will become apparent from the following descriptions to illustrate a preferred embodiment of the invention read in conjunction with the accompanying drawings in which:

FIG. 1 shows the problem addressed by the present invention in a two dimensional example;

FIGS. 2 and 3 together illustrate an overall system block diagram showing a color printing system in which the present invention might find use;

FIG. 4 shows the principle of the present invention, whereby after derivation of new empirical values, a filled rectangular array is generated, having preselected colors at nodes; and FIG. 5 illustrates the construction of the new color calibration mapping using the method and system described herein.

Referring now to the drawings where the showings are for the purpose of describing an embodiment of the invention and not for limiting same, a basic system for carrying out the present invention is shown in FIG. 2. In a system, a scanner 10, such as perhaps the color scanner available in the Xerox 5775 digital color copiers, which can be calibrated to produce a set of digital colorimetric or device independent data describing a scanned image 12, which, by definition can be defined in terms of the colorimetric $R_o$, $G_o$, $B_o$ space. Resulting from the scanning operation is a set of scanner image signals $R_s$, $G_s$, $B_s$, defined in device dependent scanner terms. Incorporated into the scanner or another processing path is a post-scanning processor 14, which provides correction of scanner image signals $R_s$, $G_s$, $B_s$ to colorimetric terms, $R_c$, $G_c$, $B_c$, typically digital in nature. The values may be in terms of CIE color space (r,g,b), or the L*a*b* luminance-chrominance space ($LC_1C_2$). A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant driving signal $C_p$, $M_p$, $Y_p$, $K_p$ that will be used to drive a printer 30. In one possible example, the colorant values represent the relative amounts of cyan, magenta, yellow, and black toners that are to be deposited over a given area in an electrophotographic printer, such as, again, Xerox 5775 digital color copiers. The printed output image may be said to be defined in terms of $R_p$, $G_p$, $B_p$, which are hoped to have a relationship with $R_o$, $G_o$, $B_o$ such that the printed output image has a color that is colorimetrically similar to the original image, although that similarity is ultimately dependent upon the gamut of the printing device. As described in U.S. Pat. No. 5,305,119 to Rolleston et al., black addition for under color removal and gray balance processing may also be combined into the color space transform element. Although these features are not required, they are desirable and are illustrated herein. When we refer to colorimetric spaces, we are referring to spaces which are transforms of CIE XYZ space (1931). Such colorimetric spaces are also inherently device independent. When we refer to device dependent space, we refer to a color space which is defined only in terms of operation of the device using it. While many color spaces have three dimensions, it is possible to have color spaces with less than three dimensions or more than three dimensions.

With reference now to FIG. 3, and color space transformation and color correction 20, initially, $R_c$, $G_c$, $B_c$ color signals are directed to an interpolation device 140, which includes a three dimensional look up table stored in a device memory 150 such as a RAM or other addressable memory device, which will meet speed and memory requirements for a particular device. Color signals $R_c$, $G_c$, $B_c$ are processed to generate address entries to the table which stores a set of transform coefficients with which the $R_c$, $G_c$, $B_c$ may be processed to convert them to $C_x$, $M_x$, $Y_x$ colorant signals or any multi-dimensional output color space including but not limited to CMYK or spectral data. Values which are not mapped may be determined through interpolation.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values.

To create the table, a set of color patches are created, preferably including determined linearization and black addition. This is done by printing and measuring about 1000 to 4000 patches of printer colors distributed throughout the color space, i.e., a large set of printer driving signals are generated, in varying densities of combinations of C,M,Y,K, and used to drive the printer. The color of each patch is measured, using a spectrophotometer to determine color in terms of $R_c$, $B_c$, $G_c$. Importantly, the colorimetric value to be mapped to a device value without interpolation must be known. The measured colors of these patches are used to build a three dimensional look up table (LUT) relating $R_c$, $B_c$, $G_c$ defined colors to $C_xM_xY_x$ defined colors. Conversions that do not include mapped and measured points may be interpolated or extrapolated. Reference is made to U.S. pat. application Ser. No. 08/144,987 to Rolleston entitled, "Color Printer Calibration Test Pattern", filed Oct. 29, 1993, which shows and describes a calibration test pattern for this purpose.

With reference again to FIG. 2, a calibration image is conveniently stored in a device memory such as calibration ROM 60, RAM, floppy or the like, or are generated on the fly with a predetermined generation function. Signals stored therein are directed to the printer under the control of printer controller 65. Spectrophotometer 70 (which can alternatively be a colorimeter, a calibrated densitometer or even a calibrated color scanner) is used to scan the calibration target and produce $R_oG_oB_o$ signal values as a function of sensed density, representing the colors of each scanned patch.

Interpatch correlation processor 80 reads the responses provided from spectrophotometer 70 for each location in the calibration target and correlates the response with the input CMY signals, so that an CMY to $R_cG_cB_c$ mapping is generated. The data derived at interpatch correlation processor 80 is directed to LUT processor 100, which generates the required look up tables for storage in color space transform and color correction 20. One convenient embodiment of the invention, is provided by a software routine, installed in LUT processor 100, which processes the CMY to $R_cG_cB_c$ mapping to obtain the required LUT.

Now the principle of the present invention will be described with reference to FIG. 1 and FIG. 4. It can be seen from FIG. 1, that a small adjustment in the position of the node spacing can place the colorimetric nodes at positions which correspond to the pure red and pure green points (X and Y) (primary colors represented in this two dimensional depiction) in the device dependent space. FIG. 4 shows the changes made. With a denser sampling of the space, as would be expected in real situations which use LUT's that are 16×16×16 in size, only small adjustments to the node locations are required. In addition, it is common that the systems in which the invention will find use, are limited to using unsigned 8 bit values within the LUT. In such arrangements, it is difficult to produce a value of 255 if any amount of interpolation is to be done. However, the invention applies not only to pure colors (red, green, blue cyan, magenta, and yellow) (primaries and secondaries) that appear at these difficult processing points in the look up table, but also applies to speciality colors (particular colors selected for logos, trademarks or the like) or may also apply to sets of particularly well defined colors, such as colors in the Pantone color set that are selected as important to a user.

In FIG. 4, it can be seen that, while maintaining the filled rectangular array, the nodes can be adjusted so that a node occurs at pure red and pure green, with little significant change. Note that for this case, the number of nodes has not been increased, and no separate derivation of measurement data has been required. The planes in which the selected colors are found replace the nearest standard planes, so the spacing of the table through the space is approximately retained. It is possible, of course, to increase the number of nodes to represent special colors, if desired.

In general, the process may operated as detailed in FIG. 5. At step 200, a set of CMY to $R_cG_cB_c$ mappings are received. At step 202, a first set of specific colors $R_I$, $G_I$, $B_I$ are identified, in terms of device independent values. At step 204, a second set of colors $R_j$, $G_j$, $B_j$ are identified, typically selected on the basis of a predetermined spacing relationship. As noted, possible spacing relationships is given as a square root function, or a cube root function or a log function. At step 206, the two sets are compared to identify which of colors $R_j$, $G_j$, $B_j$ are nearest to the specific colors $R_I$, $G_I$, $B_I$. At step 208, each identified member of $R_j$, $G_j$, $B_j$ is then replaced with the corresponding $R_I$, $G_I$, $B_I$. At step 208, data points are generated to fill the rectangular array of data, so that a set of colors $R_k$, $G_k$, $B_k$ are generated, representing nodes in a filled rectangular array in colorimetric color space.

At step 220, for each member of $R_k$, $G_k$, $B_k$ new values of CMY are generated with an inverse interpolation process. As noted previously, one method of accomplishing this requirement is by an interpolation process which derives a value at a desired location as a function of all (or a significant set) of measured color values. One way of doing this is to use Shepard's Method (see, for example "Shepard's Method of 'Metric Interpolation' to Bivariate and Multivariate Interpolation" by W. Gordon and J. Wixom, Mathematics of Computation, Vol. 32, No. 141, January 1978, pp. 253–264). Shepard's Method suggests that a vector can be thought of as defining the difference between an asked-for color which was directed to a printer in the printed color. Then, for any other point in color space which is desired, that point can be thought of as a vector quantity, derived by averaging over the space all the vectors, each vector weighted by a function which decreases its effect on the vector as that vector is further and further away from the point coloring question. In one useful formula, each vector is weighted by a function of $1/d^4$.

The calculated mappings are directed to LUT processor 100, in order to generate a new color transformation LUT for storage at color space transform and color correction 20.

It will no doubt be appreciated that while we have shown the use of the invention in the conversion of a device independent color space to a device dependent color space, the invention applies equally as well to conversions to any transformation from a first space to a second, device independent or device dependent.

It will no doubt be appreciated that the invention can be accomplished with either software, hardware or combination software-hardware implementations.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A color printer calibration method for improving printer accuracy for specific colors includes the steps of:
   a) empirically deriving a set of mappings, each mapping indicating a conversion from a printer color space color to colorimetric color space color;
   b) identifying a first set of colors in colorimetric color space, for which mappings without interpolation from colorimetric space to device independent space are desired;
   c) identifying a second set of colors in colorimetric color space, dispersed through said space in accordance with a predetermined spacing function;
   d) identifying from said first and second sets, colors which are near each other in color space, and replacing identified second set colors with corresponding identified first set colors, to generate a new final set of colors;
   e) deriving from said empirically derived set of mappings an inverted set of mappings required for printer calibration at each of the colors in said final set of colors.

2. The calibration method as described in claim 1, wherein said first set colors comprises fully saturated primary colors.

3. The calibration method as described in claim 1, wherein said first set colors comprises fully saturated secondary colors.

4. The calibration method as described in claim 1 and additionally identifying and adding to the final set of colors sufficient additional colors to provide a filled, rectangular array of colors in device colorimetric color space.

5. A printer, calibrated in accordance with the method of claim 1.

6. The method as defined in claim 1, wherein the addition of said first set of colors to said second set of colors creates a final set of colors which maintains a regular array of colors, with a set of nodes on each of any axes forming said regular array, each said set of nodes different than each of the other sets.

7. A color printer calibration method for improving printer accuracy for specific colors includes the steps of:
   a) empirically deriving a set of mappings, each mapping indicating a conversion from a printer color space color to colorimetric color space color;
   b) identifying a first set of colors in colorimetric color space, for which mappings without interpolation from colorimetric space to device independent space are desired;
   c) identifying a second set of colors in colorimetric color space, dispersed through said space in accordance with a predetermined spacing function;
   d) to said set of empirically derived mappings, adding members of said first set of colors, or replacing members of said second set of colors with members of said first set of colors, to generate a new final set of colors;
   e) deriving from said empirically derived set of mappings an inverted set of mappings required for printer calibration at each of the colors in said final set of colors.

8. The calibration method as described in claim 7, wherein said first set colors comprises fully saturated primary colors.

9. The calibration method as described in claim 7, wherein said first set colors comprises fully saturated secondary colors.

10. The calibration method as described in claim 7 and additionally identifying and adding to the final set of colors sufficient additional colors to provide a filled, rectangular array of colors in device colorimetric color space.

11. A printer, calibrated in accordance with the method of claim 7.

12. The method as defined in claim 6, wherein the addition of said first set of colors to said second set of colors creates a final set of colors which maintains a regular array of colors, with a set of nodes on each of any axes forming said regular array, each said set of nodes different than each of the other sets.

* * * * *